Sept. 4, 1945. R. E. CARTER 2,384,281
DOUBLE PORT ROTARY SEAL
Filed May 8, 1944
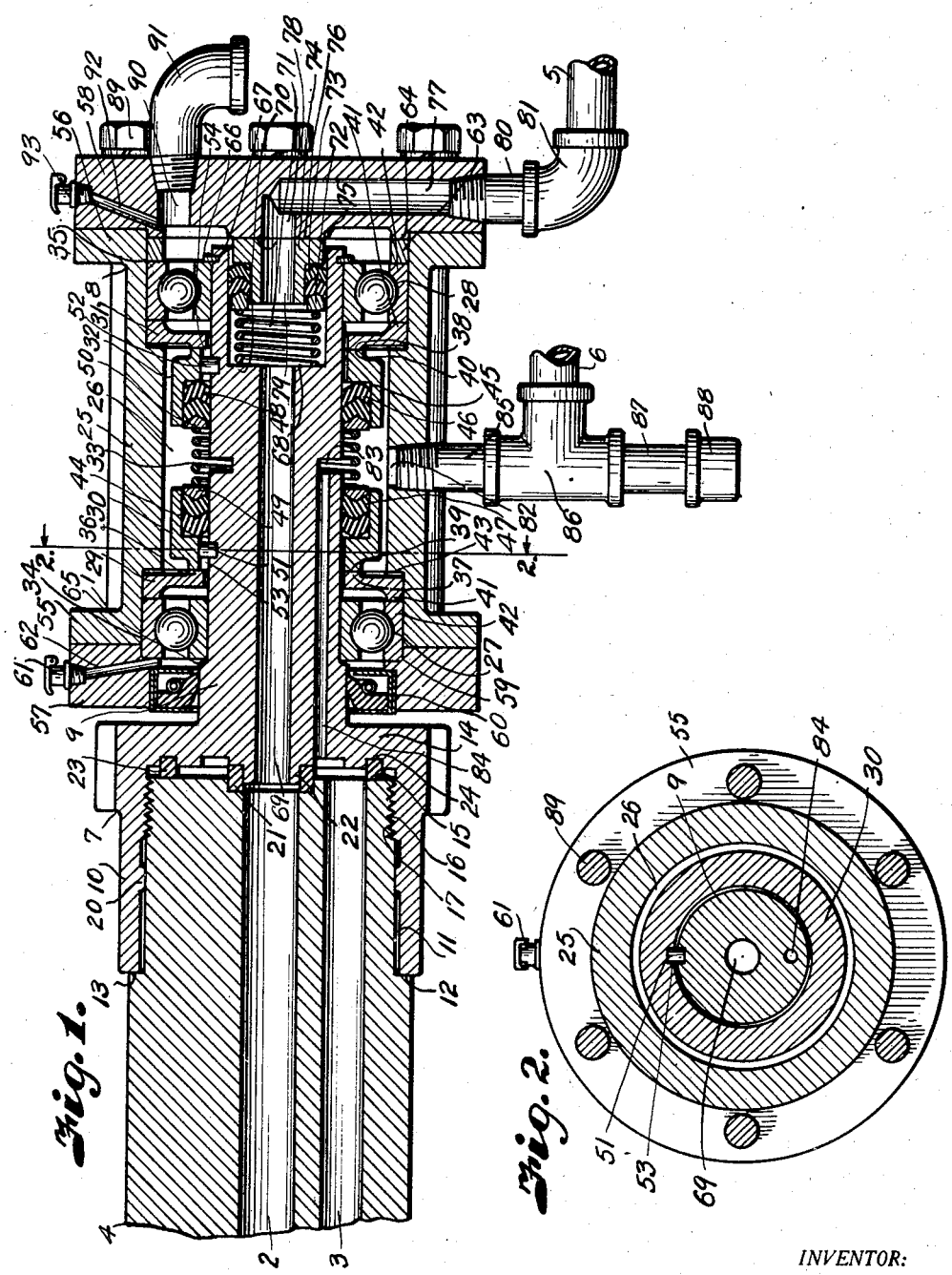
INVENTOR:
Ray E. Carter.
BY
Paul E. Mullendore
ATTORNEYS.

Patented Sept. 4, 1945

2,384,281

UNITED STATES PATENT OFFICE 2,384,281

DOUBLE PORT ROTARY SEAL

Ray E. Carter, Tulsa, Okla., assignor to Unit Rig & Equipment Company, Tulsa, Okla., a partnership Application May 8, 1944, Serial No. 534,579

16 Claims. (Cl. 285—10)

This invention relates to an apparatus for connecting flow channels in a rotary member with separate supplies of fluid pressure medium and has for its principal objects to provide an apparatus of this character which prevents leakage of the pressure medium with a minimum loss of power; to provide a connecting apparatus wherein the sealing surfaces remain cool when the rotary member is operated at relative high speeds; to provide a connecting apparatus wherein the seals are constructed to automatically compensate for wear, thereby avoiding the necessity of adjustment; and to provide a connecting apparatus with sealing members that are retained from rotation on the rotary member.

In accomplishing these and other objects of the invention, I have provided improved structure, the preferred form of which is illustrated in the accompanying drawing wherein:

Fig. 1 is a longitudinal sectional view through a connecting apparatus constructed in accordance with the present invention.

Fig. 2 is a cross section on the line 2—2 of Fig. 1.

Referring more in detail to the drawing:

1 designates an apparatus for connecting a plurality of fluid conducting channels 2 and 3 in a rotary shaft or a similar member 4 with separate supplies of a fluid pressure medium, the pressure medium being admitted through substantially rigid ducts 5 and 6.

The connecting device 1 comprises rotary and stator members 7 and 8. The rotary element 7 includes a substantially cylindrical spindle portion 9 forming a coaxial extension of the shaft 4 and which is secured to the shaft to rotate therewith by a coupling portion 10. The portion 10 includes a socket 11 engaging over a reduced end of the shaft 4 and having an end face 12 abutting the annular shoulder 13 that is formed by the reduced end of the shaft as shown in Fig. 1. The opposite end of the socket is connected with the shaft portion 9 by a web 14 slightly spaced from the end face 15 of the shaft, the socket portion being fixed to the shaft by internal threads 16 engaging external threads 17 on the reduced portion of the shaft 4, as shown in Fig. 1. The unthreaded portion of the bore of the socket is preferably larger in diameter than the reduced end of the shaft but has an internal rib 20 spaced from the threads to cooperate with the shoulder 13 in maintaining alignment of the spindle portion 9. One of the channels; for example, channel 2, is located centrally of the shaft 4 and has a recess or counterbore at the terminal end thereof for receiving a packing ring 21 which encircles a seat on a boss 22 projecting inwardly from the spindle portion 9 whereby a seal is maintained between the shaft and the coupling element for the channel 2.

The channel 3 is formed in the shaft in offset relation to the axial channel and the end thereof connects with the space at the end of the shaft, the space being sealed circumferentially of the channel 3 by a packing ring 23 that is supported by a part thereof engaging in an annular groove 24 in the face of the web 14 and which bears against the end face 15 of the shaft as shown in Fig. 1. With this arrangement, the spindle or rotary member is readily connected with the end of the shaft and maintains a leak-tight joint therewith. The stator member 8 is mounted on the spindle portion 9 and includes a substantially sleeve-like body 25 of a larger diameter than the spindle to provide an annular space 26 therebetween for accommodating anti-friction bearings 27—28, pairs of sealing rings or elements 29—30 and 31—32, and a compression spring 33, all located concentrically of the spindle and housed within the sleeve-like body of the stator. The bore of the sleeve-like body is counterbored at the ends thereof as at 34 and 35 to accommodate the sealing elements 29 and 32 along with the anti-friction bearings 27 and 28 so that the outer races of the bearings and the periphery of the sealing elements may be rigidly clamped within the stator member. The sealing elements 29 and 32 comprise rings having inner diameters of a size to be freely slidable upon the spindle portion and having annular ribs 36 on the facing sides thereof for providing annular sealing faces 37 and 38 for contact with corresponding sealing faces 39 and 40 on the cooperating sealing members 30 and 31. The opposite sides of the sealing members 31 and 32 have annular ribs 41 for seating against the outer races 42 of the bearings. If necessary, gasket rings 43 may be inserted between the ends of the counterbores and the sealing rings.

The sealing rings 30 and 31 are also slidable on the shaft and have facing annular bores cooperating with the spindle portion 9 to provide annular recesses 44 and 45 for containing packing elements 46 and 47 of any suitable type. The packing elements here illustrated comprise a series of nested V-shaped packing washers 48 formed of compressible material and having the inner and outer portions thereof respectively contacting the surface of the spindle portion of the rotary member and the sealing members 30 and 31. The packing washers are urged in sealing contact by the coil spring 33 which has its ends bearing against packing followers 49 and 50.

In order to prevent rotation of the sealing rings 30 and 31, the spindle portion of the rotary member is provided with pins 51 and 52 engaging in longitudinal ways 53 and 54 within the sealing rings as shown in Fig. 1.

The ends of the sleeve-like body of the stator have annular flanges 55 and 56 for attaching a retaining ring 57 at the shaft end and a head 58 at the other. The ring 57 has an annular recess 59 encircling the inner circumference thereof to accommodate a projecting portion of the outer race of the adjacent bearing so that the ring is centered with respect to the spindle portion 9 on which the bearing is mounted. The retaining ring 57 also carries an oil sealing ring or packing 60 adapted to sealingly engage the inner circumference of the retaining ring and the circumference of the spindle portion of the connecting member so that when lubricant is supplied to the anti-friction bearing, it is trapped between the lubricant seal and the packing within the sealing ring 30. Lubricant may be supplied to the bearing through an oil cup or the like 61 having connection with the bearing recess through a channel 62 that is drilled into the retaining ring.

The head 58 closes the outer end of the stator member and seats against the flange 56 to retain a spacer ring 63 that is positioned within the counterbore and engages the outer race of the bearing 28 which anchors the sealing ring 32 in fixed engagement with the bottom of the counterbore. To maintain concentric relationship of the head with respect to the sleeve-like body, the inner face thereof is preferably provided with an annular rib 64 that extends into the counterbore accommodating the bearing as shown in Fig. 1. The inner races of the bearings are pressed on the spindle portion 9 with the inner race of the bearing 27 engaging against a shoulder 65 on the shaft and that of the bearing 28 engaging against a lock ring 66 received in an annular groove 67 of the spindle portion.

In order to prevent leakage of pressure medium between the end of the spindle portion 9 and the head 7, the end of the spindle is provided with a counterbore 68 coaxial with flow channel 69 therein. The counterbore forms an annular shoulder 70 at the inner end thereof to seat one end of a coil spring 71 which has its opposite end bearing against a follower ring 72 for pressing packing elements 73 which are mounted between the circumferential wall of the bore and a sealing member 74 having an end face 75 contacting a face 76 on the head 58, the sealing member having a reduced neck to support the packing elements.

In order to connect the duct 5 with the axial channel in the spindle for supplying pressure medium to the port 2 in the shaft, the head is provided with a radial channel 77 opening inwardly from the periphery thereof and intersecting an axial recess 78 in the head which in turn connects with an axial bore 79 in the sealing member. The outer end of the channel 77 is preferably threaded to receive a nipple 80 by which the duct 5 may be connected through an L 81. Fluid pressure medium is supplied to the channel 3 by connecting the duct 6 with a port 82 opening through the sleeve-like body of the stator member whereby the pressure medium is admitted between the packing elements which seal the spindle portion of the rotary member. The fluid passes into an annular recess 83 formed in the spindle and which connects with the channel 3 through a port 84 which is drilled or otherwise formed in the spindle portion in parallel relation with the annular flow channel. The duct 6 may be connected with one branch of a T fitting 86 having the lateral branch thereof connected with the duct 5. The other branch of the T fitting may be provided with a nipple 87 to provide an anchor for overcoming tendency for the stator to rotate, the outer end of the nipple being closed by a cap 88 provides a trap for sediment or the like that may be contained in the pressure medium.

The retaining ring and sleeve-like body and head of the stator member of the connecting device are interconnected by fastening devices such as cap screws 89 passing through suitable openings in the head and flanges on the sleeve-like body into threaded openings of the retaining member, the cap screws being drawn up so that the heads thereof cooperate with the retaining ring in clamping the parts together and retaining the assembly. If desired, the head may be provided with a vent opening 90 in which is threadingly mounted one branch of the street L 91 and having the other branch turned downwardly as shown in Fig. 1. The bearing 28 may be provided with suitable lubricant similar to the other bearing through port 92 in the head and having connection with an oil cut or the like 93.

In assembling the rotary and stator members, the sealing element 60 is mounted within the ring 57 and the ring is moved onto the shaft portion 9 of the rotary member followed by the bearing 27, sealing rings 29 and 30, packing elements 47, follower ring 49, spring 33, follower ring 50, packing elements 48, and sealing ring 32, with the ways 53 and 54 of sealing rings 30 and 32 passing over the projecting ends of the pins 51 and 52. The springs 71, follower ring 72, and sealing member 76 are mounted within the counterbore 68. The sleeve-like body of the stator 25 is passed over the assembled parts after which the sealing ring 31, bearing 28 and spacer ring 63 are inserted through the open outer end of the sleeve-like body. The retainer ring 66 is then inserted in the groove 70. The head 58 is then applied and secured by fastening devices 89. The portion 10 of the stator member is then screwed upon the threaded end of the shaft 4 so that the sealing rings 23 and 21 are in contact with the end thereof as shown in Fig. 1. The nipples 80 and 85 are screwed into the head 50 and opening 82 respectively. The fittings 81 and 86 are screwed onto the nipples and the ducts 5 and 6 are connected with a source of pressure medium which is to be delivered to the channels 2 and 3.

In operation, pressure medium is delivered to the channel 2 by way of the channel 77 in the head 58, recess 78, bore 68, and channels 69. Pressure medium is delivered to the channel 3 through port 82, annular groove 83, and port 84. A suitable lubricant is inserted into the bearings 27 and 28 through the cups 61 and 93. When the shaft 4 is rotated the rotary member rotates therewith within the stator member and since the sealing rings 30 and 32 are keyed therewith by the pins 51 and 52, the coil spring 33 compresses the packing elements 47 and 48 to effect a seal about the shaft portion 9 of the rotary member and the sealing rings 29 and 31 form a seal with the rings carried by the sleeve-like body of the stator; consequently, the space 26 is sealed so that the pressure medium delivered thereto passes through the port 84 into the channel 3. The sealing member 74 cooperates with the packing elements 73 to maintain a rotary seal between the shaft portion 9 and the head 56 of the stator so that the pressure medium delivered through the channel 77 is delivered through the channel 69 to the channel 2 of the rotary shaft 4.

If any leakage should occur it is readily discharged through the port 90 which is open to atmosphere through the street L 91.

From the foregoing it is obvious that I have provided an effective seal between stationary ducts and flow channels within a rotating shaft.

It is also obvious that arrangement of packing and sealing faces of the sealing members are effective in maintaining a positive seal with a minimum loss of power so that the parts remain cool even when the shaft is operated at relative high speeds.

What I claim and desire to secure by Letters Patent is:

1. In an apparatus of the character described, a rotary member having a flow channel for a pressure medium, a stator member enclosing the rotary member and having an inlet for a pressure medium connected with the flow channel, a pair of sealing rings encircling the rotary member on each side of said connection between the flow channel and inlet, the sealing rings having contacting annular sealing faces to form a seal therebetween, packing elements having sealing contact with adjacent sealing rings of said pairs and with the rotary member, resilient means interposed between said packing elements to urge the packing elements into said sealing contact and to maintain the seal between the contacting faces of said sealing rings, means slidably anchoring the adjacent sealing rings of the respective pairs to the rotary member for rotation therewith, and means anchoring the other sealing rings of said pairs to the stator member.

2. In an apparatus of the character described, a rotary member having a flow channel for a pressure medium, a stator member enclosing the rotary member and having an inlet for a pressure medium connected with the flow channel, a pair of sealing rings encircling the rotary member on each side of said connection between the flow channel and inlet, the sealing rings having contacting annular sealing faces to form a seal therebetween, packing elements having sealing contact with adjacent sealing rings of said pairs and with the rotary member, resilient means interposed between said packing elements to urge the packing elements into said sealing contact and to maintain the seal between the contacting faces of said sealing rings, means slidably anchoring the adjacent sealing rings of the respective pairs to the rotary member for rotation therewith, means anchoring the other sealing rings of said pairs to the stator member, and anti-friction bearings between the rotor and stator members having outer races in backing contact with the outer of said sealing rings.

3. In an apparatus of the character described, a rotary member having a flow channel for a pressure medium, a stator member enclosing the rotary member and having an inlet for a pressure medium connected with the flow channel, a pair of sealing rings slidably encircling the rotary member on each side of said connection between the flow channel and inlet, the sealing rings having contacting annular sealing faces to form a seal therebetween, packing elements having sealing contact with adjacent sealing rings of said pairs and with the rotary member, resilient means interposed between said packing elements to urge the packing elements into sealing contact and to maintain the seal between the contacting faces of said sealing rings, means anchoring the adjacent sealing rings of the respective pairs to the rotary member for rotation therewith, means anchoring the other sealing rings of said pairs to the stator member, anti-friction bearings between the rotor and stator members having outer races in backing contact with the outer of said sealing rings, and lubricant retaining means carried by the stator on outer sides of said anti-friction bearings.

4. In an apparatus of the character described, a spindle-like rotary member having a longitudinal flow channel offset from the axis thereof and opening from a radial port in said member, a stator member enclosing the rotary member and having an inlet for a pressure medium connected with the flow channel, a sealing means located at each side of said port and encircling the spindle-like rotary member, each sealing means having contacting annular rotative sealing faces to form seals with the rotor and including packing elements having sealing contact with the spindle-like rotary member, resilient means interposed between said packing elements to urge the packing elements into said sealing contact and to maintain the rotative seal, bearings between the spindle-like rotor and outer ends of the stator and having contact with the rotor and stator to retain concentric relation of the stator and rotor, means closing ends of the stator for retaining said bearings, and means for supplying lubricant to said bearings.

5. In an apparatus of the character described, a spindle-like rotary member having a longitudinal flow channel offset from the axis thereof and opening from a radial port in said member, a stator member enclosing the rotary member and having an inlet for a pressure medium connected with the flow channel, a sealing means located at each side of said port and slidably encircling the spindle-like rotary member, each sealing means having contacting annular rotative sealing faces to form seals with the rotor and including packing elements having sealing contact with the spindle-like rotary member, resilient means interposed between said packing elements to urge the packing elements into said sealing contact and to maintain the rotative seal, bearings between the spindle-like rotor and outer ends of the stator, means closing ends of the stator for retaining said bearings, means for supplying lubricant to said bearings, and means for anchoring said sealing means to the spindle-like rotary member for rotation therewith.

6. In an apparatus of the character described, a rotary member having separate flow channels for a pressure medium, a stator member enclosing the rotary member and having inlets for a pressure medium connected respectively with the flow channels, a pair of sealing rings slidably encircling the rotary member on each side of one of said connections, the sealing rings of each pair having contacting annular sealing faces to form a seal therebetween, packing elements having sealing contact with adjacent sealing rings of said pairs and with the rotary member, resilient means interposed between said packing elements to urge the packing elements into said sealing contact and to maintain the seal between the contacting faces of said sealing rings, means anchoring adjacent sealing rings of the respective pairs to the rotary member for rotation therewith, means anchoring the other sealing rings of said pairs to the stator member, and packing means carried by the rotary member and having rotary sealing contact with the stator in encircling relation with the other inlet.

7. In an apparatus of the character described, a rotary member having separate flow channels for a pressure medium, a stator member enclosing the rotary member and having inlets for a pressure medium connected respectively with the flow channels, a pair of sealing rings slidably encircling the rotary member on each side of one of said connections, the sealing rings of each pair having contacting annular sealing faces to form a seal therebetween, packing elements having sealing contact with adjacent sealing rings of said pairs and with the rotary member, resilient means interposed between said packing elements to urge the packing elements into said sealing contact and to maintain the seal between the contacting faces of said sealing rings, means anchoring adjacent sealing rings of the respective pairs to the rotary member for rotation therewith, means anchoring the other sealing rings of said pairs to the stator member, packing means carried by the rotary member and having rotary sealing contact with the stator in encircling relation with the other inlet, and means for venting the stator member externally of said last named packing means.

8. In an apparatus of the character described, a rotary member having separate flow channels for a pressure medium, a stator member enclosing the rotary member and having inlets for a pressure medium connected respectively with the flow channels, a pair of sealing rings slidably encircling the rotary member on each side of one of said connections, the sealing rings of each pair having contacting annular sealing faces to form a seal therebetween, packing elements having sealing contact with adjacent sealing rings of said pairs and with the rotary member, resilient means interposed between said packing elements to urge the packing elements into said sealing contact and to maintain the seal between the contacting faces of said sealing rings, means anchoring adjacent sealing rings of the respective pairs to the rotary member for rotation therewith, means anchoring the other sealing rings of said pairs to the stator member, resilient packing means carried by the rotary member and having rotary sealing contact with the stator in encircling relation with the other inlet, and anti-friction bearings between the rotary and stator members on outer ends of the stator member.

9. In an apparatus of the character described, a rotary member having separate flow channels for a pressure medium, a stator member enclosing the rotary member and having inlets for a pressure medium connected respectively with the flow channels, a pair of sealing rings slidably encircling the rotary member on each side of one of said connections, the sealing rings of each pair having contacting annular sealing faces to form a seal therebetween, packing elements having sealing contact with adjacent sealing rings of said pairs and with the rotary member, resilient means interposed between said packing elements to urge the packing elements into said sealing contact and to maintain the seal between the contacting faces of said sealing rings, means anchoring adjacent sealing rings of the respective pairs to the rotary member for rotation therewith, means anchoring the other sealing rings of said pairs to the stator member, packing means carried by the rotary member and having rotary sealing contact with the stator in encircling relation with the other inlet, anti-friction bearings between the rotary and stator members on outer ends of the stator member, means for supplying lubricant to space surrounding said bearings, and means for venting the space surrounding the bearing nearest said last named packing means.

10. In an apparatus of the character described, a spindle-like rotary member having an axial flow channel provided with an inlet at an end of said member and having a parallel flow channel offset from the axial channel and provided with a radial inlet, a stator member enclosing the spindle-like rotary member and having inlets in connection with the inlets of the flow channels for supplying a pressure medium, a pair of sealing rings slidably encircling the spindle-like rotary member on each side of said radial inlet, the sealing rings of each pair having contacting annular sealing faces to form a rotative seal therebetween, packing elements having sealing contact with adjacent sealing rings of said pairs and with the spindle-like rotary member, resilient means interposed between said packing elements to urge the packing elements into said sealing contact and to maintain the seal between the contacting faces of said sealing rings, means anchoring the adjacent sealing rings of the respective pairs to the spindle-like rotary member for rotation therewith, means anchoring the other sealing rings of said pairs to the stator member, and sealing means carried in the end of the spindle-like rotary member in encircling relation with the inlet of said stator having connection with the inlet of the axial channel, said sealing means having a sealing face in rotative contact with the stator member.

11. In an apparatus of the character described, a spindle-like rotary member having an axial flow channel provided with an inlet at an end of said member and having a parallel flow channel offset from the axial channel and provided with a radial inlet, a stator member enclosing the spindle-like rotary member and having inlets in connection with the inlets of the flow channels for supplying a pressure medium, a pair of sealing rings encircling the spindle-like rotary member on each side of said radial inlet, the sealing rings of each pair having contacting annular sealing faces to form a rotative seal therebetween, packing elements having sealing contact with adjacent sealing rings of said pairs and with the spindle-like rotary member, resilient means interposed between said packing elements to urge the packing elements into said sealing contact and to maintain the seal between the contacting faces of said sealing rings, means anchoring the adjacent sealing rings of the respective pairs to the spindle-like rotary member for rotation therewith, means anchoring the other sealing rings of said pairs to the stator member, said end of the spindle-like member having the inlet counterbored, a sealing member in said counterbore having rotative contact with a part of the stator member encircling the inlet supplying the axial flow channel, packing means within said counterbore and having sealing contact with the sealing member, and a spring in the counterbore to maintain the sealing member in rotative contact with said part of the stator member.

12. In an apparatus of the character described, a spindle-like rotary member having an axial flow channel provided with an inlet at an end of said member and having a parallel flow channel offset from the axial channel and provided with a radial inlet, a stator member enclosing the spindle-like rotary member and having inlets in connection with the inlets of the flow channels for supplying a pressure medium, a pair of sealing rings encircling the spindle-like rotary member on each side of said radial inlet, the sealing rings of each pair having contacting annular sealing faces to form a rotative seal therebetween, packing elements having sealing contact with adjacent sealing rings of said pairs and with the spindle-like rotary member, resilient means interposed between said packing elements to urge the packing elements into said sealing contact and to maintain the seal between the contacting faces of said sealing rings, means anchoring the adjacent sealing rings of the respective pairs to the spindle-like rotary member for rotation therewith, means anchoring the other sealing rings of said pairs to the stator member, said end of the spindle-like member having the inlet counterbored, a sealing member in said counterbore having rotative contact with a part of the stator member encircling the inlet supplying the axial flow channel, packing means within said counterbore and having sealing contact with the sealing member, a spring in the counterbore to maintain the sealing member in rotative contact with said part of the stator member, anti-friction bearings between the rotary and stator members, means for supplying lubricant to said bearings, and means for venting the end of the stator having said seal contacting part.

13. In an apparatus of the character described, a stator including a sleeve-like body, a spindle-like rotary member in the sleeve-like body having a longitudinal flow channel provided with an inlet port in the periphery thereof, anti-friction bearings between the spindle-like rotary member and the sleeve-like body, a retaining ring engaging the bearing at one end of the sleeve-like body and a head closing the other end, fastening means for securing the head and retaining ring, sealing rings having backing by the bearings and provided with annular sealing faces, complementary sealing rings having similar faces engaging said sealing faces of the other rings, packing means carried by the complementary rings and having sealing contact with said spindle-like rotary member on opposite sides of said inlet port, means for urging the packing into sealing contact with the spindle-like rotary member, and a connection with the sleeve-like body for supplying a pressure medium for flow through said flow channel.

14. An apparatus of the character described, including rotary and stator members, each having interconnected flow passages, sealing means for the connections between the respective passages including a member having longitudinal axial movement relative to the rotary member and having annular sealing contact with a part of the stator member, packing carried by the sealing member, and means urging the packing into sealing contact with the rotary member and the sealing member into sealing contact with said part of the stator member.

15. A dual port rotary seal including rotary and stator members, each having interconnected flow passages, sealing means for the connections between the respective passages, each including a member having longitudinal axial movement relative to the rotary member and having annular sealing contact with a part of the stator member, packings carried by the sealing member, and means urging the packing into sealing contact with the rotary member and the sealing member into sealing contact with said parts of the stator member.

16. In combination with a shaft having an axial bore and a longitudinal bore offset from the axial bore, ducts for supplying a pressure medium to said bores, a dual port rotary seal including rotary between said ducts and the shaft member, a stator member mounted on the rotary member, each member having interconnected flow passages in connection with the bores and said ducts, sealing means for the connections between the respective passages, each including a member having longitudinal axial movement relative to the rotary member and having annular sealing contact with a part of the stator member, packing carried by the sealing means, means urging the packing into sealing contact with the rotary member and the sealing means into sealing contact with said parts of the stator member, and means for connecting the rotary member to the end of the shaft.

RAY E. CARTER.